2,794,045

MONOBETAINE CITRATE

Henri Beaufour and Albert Beaufour, Dreux, and André Buzas and Claude Dufour, Puteaux, France No Drawing. Application June 7, 1954,
Serial No. 435,047

Claims priority, application France November 9, 1953

1 Claim. (Cl. 260—501)

Our invention relates to the obtention of a class of betaine salts which seem to have never been produced hitherto, to wit: betaine citrates. We have obtained such betaine citrates and have found that they are of particular interest, chiefly in the treatment of hepatic complaints.

Our invention covers a method for preparing betaine citrates through a reaction between two reagents of which one is a derivative of betaine, i. e. a hydrate or salt of betaine, while the other is constituted by citric acid or a salt of citric acid, the reaction being performed inside a solvent adapted to dissolve either of the two reagents or the final betaine citrate.

The method of preparation provided according to our invention may be executed in accordance with two different modus operandi, both of which lead to the obtention of crystalline betaine citrates.

One of said modus operandi consists in causing betaine hydrate to act on citric acid inside a solvent in which one at least of said reagents is soluble, the final betaine citrate being indifferently soluble or insoluble therein.

The other modus operandi consists in producing a double decomposition between a salt of betaine and of an organic or inorganic acid such as a chloride, a bromide, a sulfate or a phosphate of betaine, on one hand, and a salt of citric acid and of a mineral or organic base, on the other hand, the acid of the first reagent salt and the base of the second reagent salt being selected in a manner such that they form one or more salts which are insoluble in the medium in which the reaction is performed, while the betaine citrate is soluble therein, or else the betaine salt and the salt of citric acid are selected in a manner such that, the betaine citrate being insoluble in the reaction medium, the salt produced by the combination of the base and of the acid radical, originally combined with the citric acid and with the betaine respectively, is soluble therein.

In accordance with our method, the amounts of each component are calculated preferably in a manner such that the betaine and the citric acid are present at least approximately in the ratio of the molecular proportions to be obtained for them in the particular desired betaine citrate.

Our invention allows producing any desired betaine citrate as provided by the molecular proportions of the different reagents originally admixed; according to the conditions of operation, the citrates obtained may be either soluble or insoluble in the medium in which the reaction is performed.

In the case where the citrate obtained is soluble in the reaction medium, it is prepared advantageously in the following manner: the mixture is filtered and concentrated and then treated by a suitable auxiliary solvent i. e. a solvent which allows crystallization by reason of the citrate being soluble therein. The crystallization is then initiated for said betaine citrate by means of alcohol for instance, after which crystallization is allowed to continue. This being done, the betaine citrate is drained and dried, preferably in partial vacuo at a temperature under 50° C.

In the case where, on the contrary, the betaine citrate obtained is not soluble in the reaction medium, it is immediately drained and after a subsequent washing and further draining, it is dried for instance as in the preceding case.

We will disclose hereinafter an example of each of the modus operandi referred to as providing for the execution of our invention, various modifications being suggested for each of said modus operandi.

*Example I*

We prepare an alcoholic solution of betaine hydrate by treating betaine chloride with caustic soda dissolved in alcohol, the two reagents being present in molecular proportions. The sodium chloride formed precipitates. Said sodium chloride is filtered out and the remaining solution of betaine hydrate is treated with a corresponding amount of citric acid. After concentration and incorporation of alcohol, acting again as a solvent, the betaine citrate crystallizes. This procedure may be applied with various modifications. Thus, instead of treating betaine chloride, it is possible to start operating with another salt of betaine such as its bromide or its sulfate; instead of treating the betaine salt by a solution of soda, we may resort to the solution of another mineral base such as potash or baryta and we may also use if required a suitable solvent other than alcohol.

*Example II*

We mix inside a solvent constituted by water or by diluted alcohol a mixture in molecular proportions of betaine sulfate and barium citrate. The mixture is brought to a temperature at which the barium sulfate precipitates in quantitative amounts. The sulfate is drained and the solution is concentrated down to syrupy consistency. An addition of alcohol acting as a solvent produces a crystallization of the betaine citrate.

This procedure is also capable of various modifications. Thus we may use as a first solvent a liquid other than water or diluted ethyl alcohol, e. g. methanol or again we may produce the crystallization of the betaine citrate by means of acetone in lieu of alcohol.

Our invention allows obtaining in particular monobetaine citrate, which latter appears in the shape of slightly hygroscopic white crystals. These crystals are soluble in water and in methanol and less soluble in ethyl alcohol, while they are practically non soluble in ether. In their anhydrous state, said crystals melt at a temperature of about 175 to 180° C., but their melting temperature varies considerably with their moisture contents. On the other hand, the measured contents of nitrogen in the crystals thus obtained coincide with the expected theoretical figure.

Consequently, whichever modus operandi or modification thereof is resorted to, our invention provides means for obtaining crystallized betaine citrates.

What we claim is:

Mono-betaine citrate.

References Cited in the file of this patent

UNITED STATES PATENTS 2,538,763    Crooks et al. _____ Jan. 23, 1951

OTHER REFERENCES

Beilstein's Handbuch, 4th ed., vol. 4, pg. 347 (1922).
Patron-Chem. Abstracts, 44 (1950), 10204.